United States Patent [19]

Ito et al.

[11] Patent Number: 5,048,886
[45] Date of Patent: Sep. 17, 1991

[54] POWER SEAT SLIDE DEVICE FOR VEHICLES

[75] Inventors: Sadao Ito, Toyoake; Hiroshi Nawa, Chiryu, both of Japan

[73] Assignee: Aisin Seiki Kabushiki Kaisha, Aichi, Japan

[21] Appl. No.: 501,843

[22] Filed: Mar. 30, 1990

[30] Foreign Application Priority Data

Mar. 31, 1989 [JP] Japan .................................. 1-78451

[51] Int. Cl.$^5$ ............................................. B60N 2/06
[52] U.S. Cl. .................................... 296/65.1; 248/430
[58] Field of Search ................ 296/65.1; 248/429, 430

[56] References Cited

U.S. PATENT DOCUMENTS

| 2,927,627 | 3/1960 | Lohr | 296/65.1 X |
| 4,404,632 | 9/1983 | Harada et al. | 296/65.1 X |
| 4,756,503 | 7/1988 | Fujita | 296/65.1 X |
| 4,787,667 | 11/1988 | Nishino | 296/65.1 |
| 4,809,939 | 3/1989 | Matsushima et al. | 248/430 |
| 4,821,991 | 4/1989 | Aihara et al. | 296/65.1 X |
| 4,863,289 | 9/1989 | Lecerf | 296/65.1 X |
| 4,909,469 | 3/1990 | Nihei et al. | 296/65.1 X |
| 4,957,267 | 9/1990 | Terai | 248/430 |

FOREIGN PATENT DOCUMENTS 47225  10/1982  Japan .

Primary Examiner—Margaret A. Focarino
Assistant Examiner—Andrew C. Pike
Attorney, Agent, or Firm—Finnegan, Henderson, Farabow, Garrett & Dunner

[57] ABSTRACT

A power seat slide device for an automobile seat includes upper and lower guide rails and a nut and screw assembly for relative slidable movement between the upper and lower guide rails. Rollers are disposed in the lower guide rails and rotatably supported between the upper and lower guide rails. The power seat slide device further includes shoes or balls between the engagement portions provided on each of the upper and lower guide rails.

8 Claims, 3 Drawing Sheets

POWER SEAT SLIDE DEVICE FOR VEHICLES

BACKGROUND OF THE INVENTION

1. Field of the Invention

This invention relates to a vehicle seat slide device and more particularly to a power seat slide device used for a vehicle seat.

2. Statement of the Prior Art

Generally, a power seat slide device for a vehicle seat uses a screw and nut assembly for sliding and holding the seat. Further, such a screw and nut assembly is disposed between the outer and inner rails of the device, which makes the whole device complicated and causes a possibility of cutting the wire harness for the power supply source. Furthermore, due to the location of the screw and nut assembly, the device requires excessive length in the front and rear direction of the vehicle, which causes a problem of limiting the space available for an occupant of the rear seat.

Improvements have been made to obviate the above drawbacks. One such improvement is shown in a Japanese Patent Publication No. 57-47225, in which the screw and nut assembly has been housed in the rail itself. This prior art assembly, however, has to house the gears of the gear box in addition to the screw and nut assembly and the rail (upper rail) must be made large enough to house the assembly. Further, this prior art assembly uses a roller for sliding, which may cause a problem for smooth sliding which has not yet been realized.

SUMMARY OF THE INVENTION

It is, therefore, an object of the present invention to provide an improved power seat slide device for vehicles by obviating the above conventional drawbacks.

Additional objects and advantages of the invention will be set forth in the description, and in part will be obvious from the description or by practice of the invention.

To achieve the above object, a power seat slide device for a vehicle is provided. A lower rail attaches to a vehicle floor defining a linear track, having a base portion and upwardly extending side portions ending in edges. An upper rail attaches to a vehicle seat slidably attached to the lower rail for a linear movement of the upper rail along the track, having a top portion and downwardly depending side portions ending in edges, defining a space between the top portion and the base portion of the lower rail. A threaded rotatable shaft member having opposite ends is housed in the space between the upper rail and the lower rail, one of the ends being linked to the upper rail. Drive means linked to the threaded shaft member at the other end impart rotation to the threaded shaft member. Motion translation means engage with the threaded shaft member and attach to the lower rail, housed in the space between the lower and upper rail, translating rotation of the shaft member to linear movement of the upper rail along the track. Engaging means engage the upper rail and lower rail, including upwardly depending U-shaped members defined by the edges of the side portions of the upper rail, and downwardly depending U-shaped members defined by the edges of the side portions of the lower rail, the U-shaped members engaging one another. Guiding means in the engaging means guide movement of the upper rail along the track. Roller means are disposed between the upper and lower rail for slidably supporting the upper rail during movement along the track.

BRIEF DESCRIPTION OF THE DRAWINGS

These and other objects and features of the invention will become more clear with reference to the attached drawings which illustrate preferred embodiments of the invention, in which.

DETAILED EXPLANATION OF THE PREFERRED EMBODIMENTS

Figure 1:
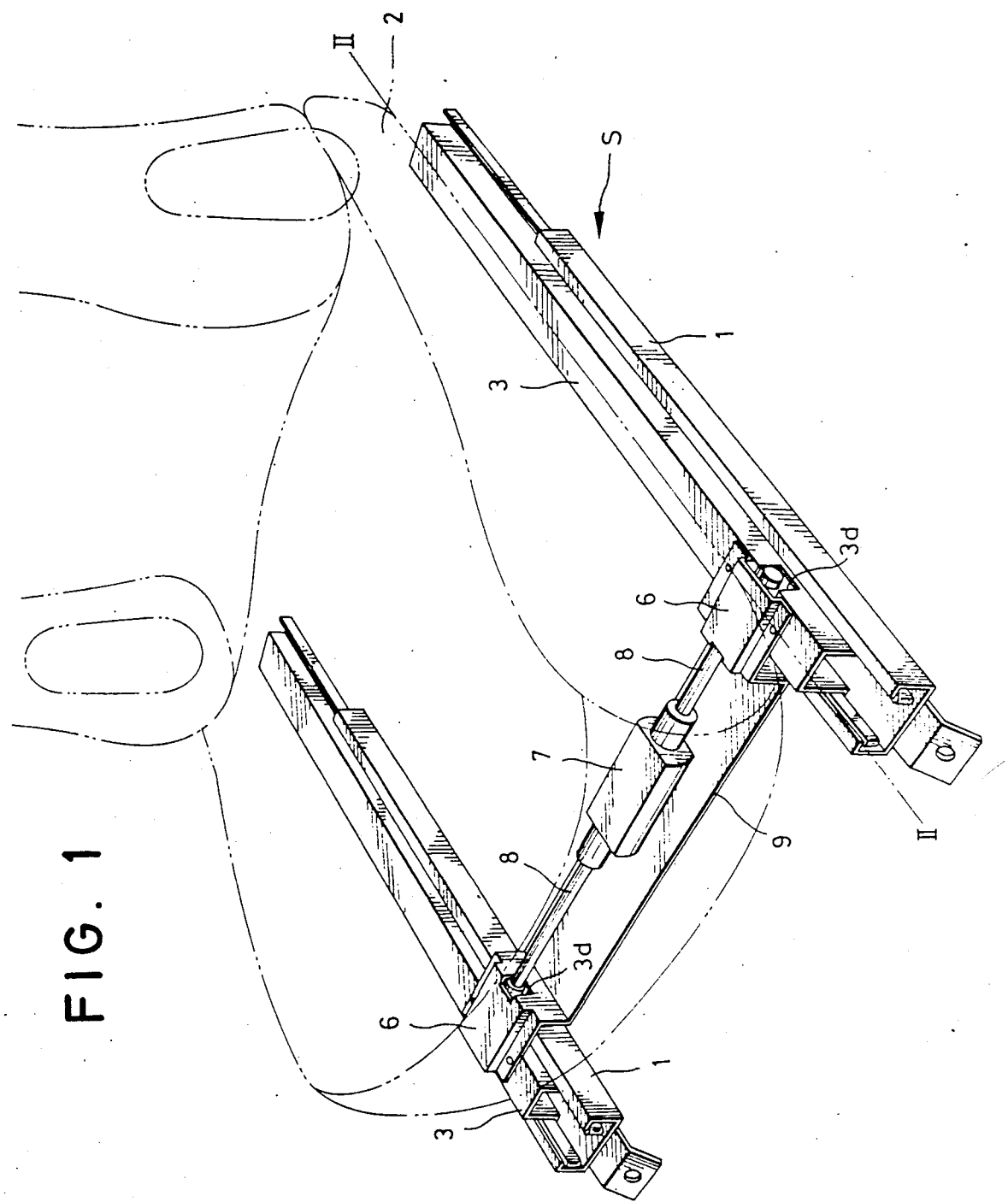
FIG. 1 shows a perspective view of the power seat slide device according to the invention.

Referring now to a preferred embodiment of the invention, a seat slide device S is shown in FIG. 1. The device S includes a pair of lower rails 1 secured to a vehicle floor (not shown) and a pair of upper rails 3 secured to a seat cushion 2 of the vehicle and slidably engaged with the lower rails 1.

Figure 3:
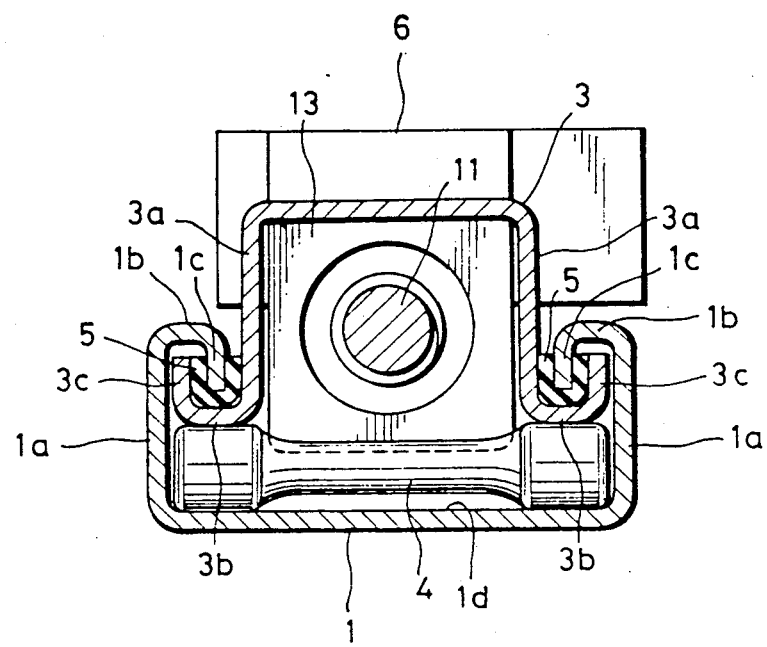
FIG. 3 shows a cross-sectional view taken along the line III—III of FIG. 2.
Figure 4:
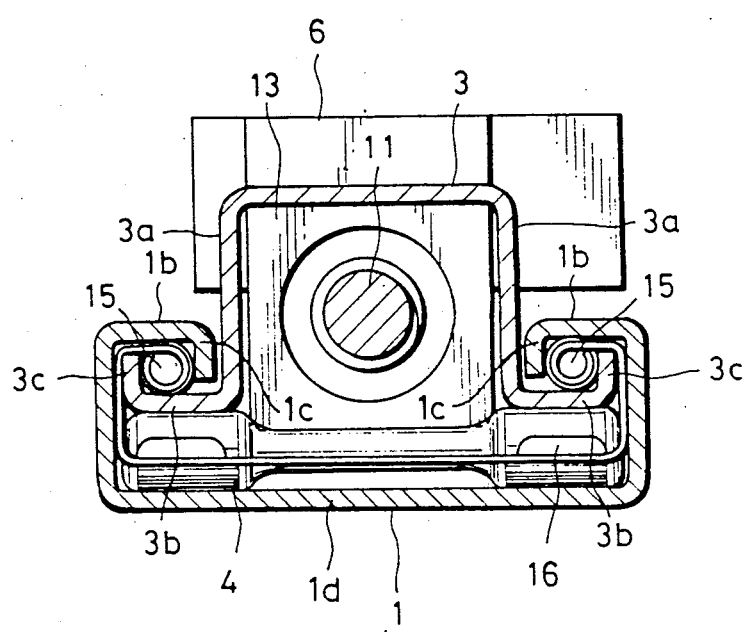
FIG. 4 shows a cross-sectional view similar to FIG. 3, but showing another type of shoe means.

As is clearly shown in FIG. 3 or FIG. 4, each upper rail 3 has a reverse U shape in cross section and each side plate section 3a is configured with an open end portion at its lower end. The open end portion includes a horizontal portion 3b and a vertical portion 3c to make a U shape in cross section. Each lower rail 1 has a U shape in cross section and its open end portion is made by two side plate sections 1a at its upper end. The open end portion of lower rail 1 further includes horizontal portion 1b and vertical portion 1c to make a reverse U shape in cross section. Both rails 3, 1 are engaged for slidable movement at their open ends.

As shown in FIGS. 3 and 4, rollers 4 are provided in the lower rail 1 between the bottom surface 1d of the lower rail 1 and the horizontal portions 3b of the upper rail 3 for rolling movement therebetween.

Preferably, as embodied in FIG. 3, a pair of shoes 5 are disposed between the upper and lower rails 3, 1 for guiding the relative slidable movement therebetween. The shoes 5 are secured to the lower rail 1 at vertical portion 1c in this embodiment.

Returning to FIG. 1, each gear box 6 is disposed in the front end of the upper rail 3 at its recessed portion 3d. The gear boxes 6 are connected to motor 7 through connecting rods 8 to form a drive portion of the device S. The motor 7 is provided at the middle portion between the upper rails 3 and under the seat cushion 2. Numeral 9 designates a support bracket for fixing gear boxes 6 and motor 7 thereon.

Figure 2:
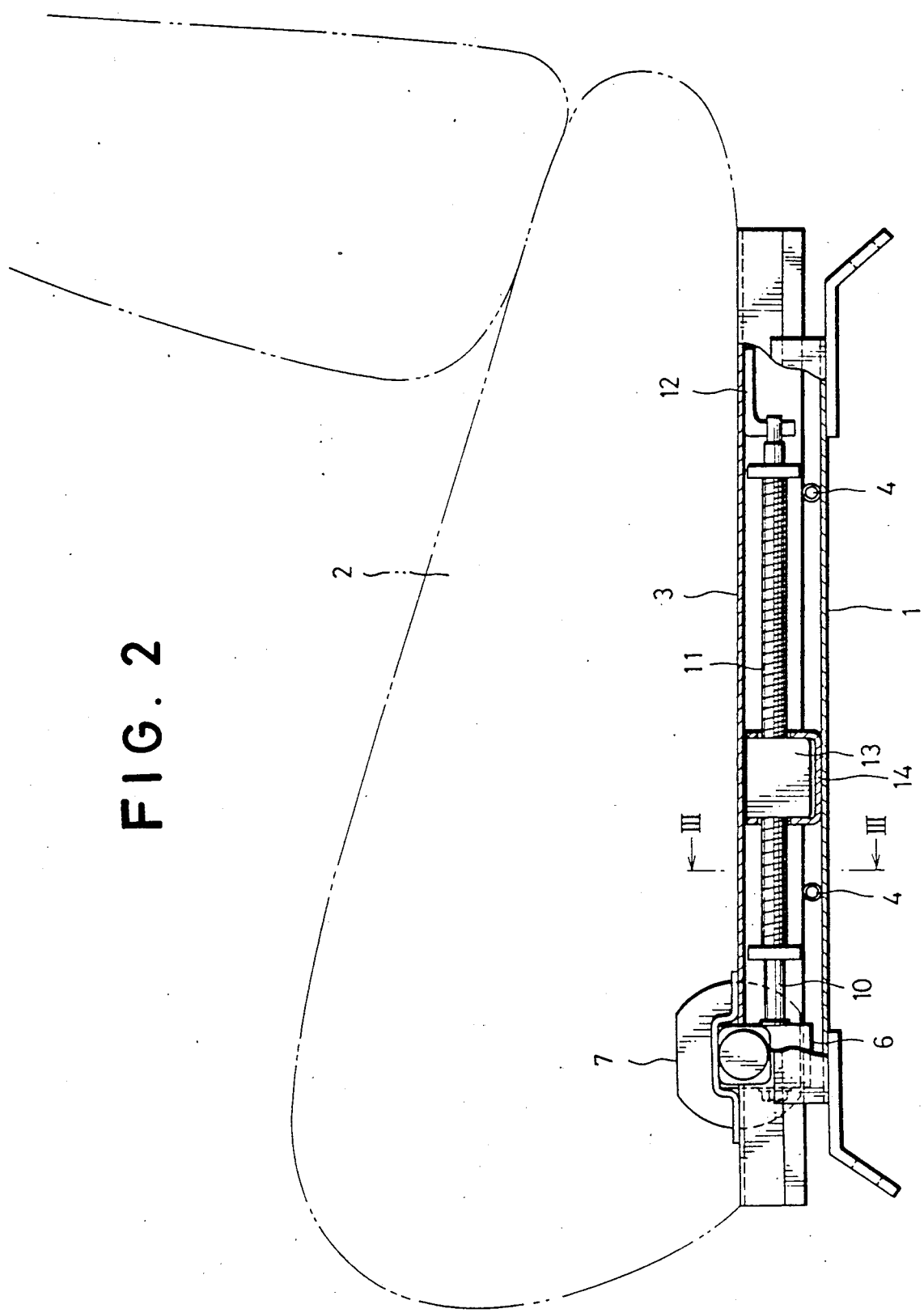
FIG. 2 shows a partial cross-sectional view taken along the line II—II of FIG. 1 of the power seat slide device of FIG. 1.

As shown in FIG. 2, the gear box 6 is connected to an output shaft 10 extending in a longitudinal direction along the upper rail 3. The output shaft 10 is rotated by the motor 7 for driving the screw 11 connected to the shaft 10 or integrally formed therewith. The other end (free end) of the screw 11 is rotatably supported by a bracket 12 secured to the upper rail 3.

Nut 13 is secured to the lower rail 1 by a bracket 14 and is engaged with the screw 11.

When the motor 7 is driven, the screw 11 is rotated by the output shaft 10. The screw 11 moves and transmits motion either forward or backward by the engagement with the nut 13 secured to the lower rail 1. Thus the upper rail 3 is moved relative to the lower rail 1 in the longitudinal direction to move or slide the seat cushion 2 on the seat slide device S in the forward or rearward direction according to the occupant's will.

When the occupant is seated on the seat cushion 2, the upper rails 3 receive the load from the occupant, which, in turn, is transmitted to the rollers 4. Under these conditions, when the screws 11 are rotated to adjust the seat position, rollers 4 are rolled along the lower rails 1 to allow smooth sliding movement to the upper rails 3. Thus the power slide device will be operated smoothly even when the seat is occupied by an occupant.

Upon vehicle collision, the seat cushion 2 receives a frontward force. The force will be actuated on the rails 3 to be pulled up from the floor of the vehicle. However, the engagement between the upper and lower rails 3 and 1 is made by the U-shaped and reverse U-shaped portions as shown in FIG. 3 and thus separation of the two rails 3 and 1 is prevented.

FIG. 4 shows another type of shoe used in the engagement portion between the upper and lower rails 3 and 1. Balls 15 are provided between the upper and lower rails 3 and 1 instead of shoes 5 as shown in FIG. 3. The balls 15 are supported by the guide plate 16.

Additional advantages and modifications will readily occur to those skilled in the art. The invention, in its broader aspects, is not limited to the specific details shown and described. Rather, the invention is defined by the claims and their equivalents. Departures may be made from the details described herein without departing from the scope of the invention.

What is claimed is:

1. A power seat slide device for a vehicle comprising:
a lower rail for attachment to a vehicle floor defining a linear track, having a base portion and upwardly extending side portions ending in edges;
an upper rail for attachment to a vehicle seat slidably attached to said lower rail for a linear movement of said upper rail along the track, having a top portion and downwardly depending side portions ending in edges, defining a space between the top portion and the base portion of said lower rail;
a threaded rotatable shaft member having opposite ends housed in said space between said upper rail and said lower rail, one of said opposite ends linked to said upper rail;
drive means linked to said threaded shaft member at the other said opposite end for imparting rotation to said threaded shaft member;
motion translating means engaged with said threaded shaft member and attached to said lower rail, housed in said space between said upper rail and said lower rail, for translating the rotation of said threaded shaft member to the linear movement of said upper rail along the track;
engaging means for engaging said upper rail and lower rail, including upwardly depending first U-shaped members disposed at said edges of the side portions of said upper rail, and downwardly depending second U-shaped members disposed at said edges of the side portions of said lower rail, said first U-shaped members engaging said second U-shaped members;
guiding means provided in the engaging means for guiding the movement of said upper rail along the track; and
roller means disposed between the base portion of said lower rail and said first U-shaped members for slidably supporting the upper rail during movement along the track.

2. A power seat slide device according to claim 1, further including a second lower rail for attachment to the vehicle floor and a second upper rail for attachment to the vehicle seat slidably attached to said second lower rail.

3. A power seat slide device according to claim 1, wherein said edges of said upper rail are configured to form said first U-shaped members.

4. A power seat slide device according to claim 1, wherein said edges of said lower rail are configured to form said second U-shaped members.

5. A power seat slide device according to claim 1, wherein said guiding means includes a U-shaped shoe member disposed between said first and second U-shaped members of said engaging means.

6. A power seat slide device according to claim 1, wherein said guiding means includes a ball disposed between said first and second U-shaped members of said engaging means.

7. A power seat slide device according to claim 1, wherein said driving means includes a motor and a gear mechanism linking said motor to the threaded shaft member.

8. A power seat slide device according to claim 1, wherein said motion translating means includes a nut having a threaded aperture engaging said threaded shaft, and a side portion fixed to said lower rail.

* * * * *